United States Patent
Kini et al.

(10) Patent No.: US 9,483,423 B2
(45) Date of Patent: Nov. 1, 2016

(54) TECHNIQUES FOR ASSIGNING PRIORITIES TO MEMORY COPIES

(71) Applicant: NVIDIA CORPORATION, Santa Clara, CA (US)

(72) Inventors: Vivek Kini, Sunnyvale, CA (US); Christopher Lamb, San Jose, CA (US); Mark Hairgrove, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 635 days.

(21) Appl. No.: 13/897,193

(22) Filed: May 17, 2013

(65) Prior Publication Data

US 2014/0344528 A1   Nov. 20, 2014

(51) Int. Cl.
  *G06F 13/16* (2006.01)
  *G06F 9/52* (2006.01)
  *G06F 13/18* (2006.01)

(52) U.S. Cl.
  CPC ............. *G06F 13/1663* (2013.01); *G06F 9/52* (2013.01); *G06F 13/16* (2013.01); *G06F 13/1605* (2013.01); *G06F 13/1642* (2013.01); *G06F 13/18* (2013.01)

(58) Field of Classification Search
  CPC ............... G06F 13/16; G06F 13/1605; G06F 13/1642; G06F 13/18; G06F 9/52
  See application file for complete search history.

(56) References Cited

U.S. PATENT DOCUMENTS

| | | | |
|---|---|---|---|
| 7,143,250 B1 * | 11/2006 | Riedl | G06F 3/0613 710/37 |
| 7,386,782 B2 * | 6/2008 | Comps | G06F 17/30056 375/E7.003 |
| 2002/0133530 A1 * | 9/2002 | Koning | G06F 9/52 718/102 |
| 2014/0109102 A1 * | 4/2014 | Duncan | G06F 9/3851 718/103 |

* cited by examiner

*Primary Examiner* — Aracelis Ruiz
(74) *Attorney, Agent, or Firm* — Artegis Law Group, LLP

(57) ABSTRACT

One embodiment sets forth a method for guiding the order in which a parallel processing subsystem executes memory copies. A driver creates semaphores for all but the lowest priority included in a plurality of priorities and associates one priority with each copy hardware channel included in the parallel processing subsystem. The driver then aliases prioritized streams to the copy hardware channels based on the priorities. Upon receiving a request to execute a memory copy within one of the streams, the driver inserts commands into the aliased copy hardware channel. These commands use the semaphores to direct the parallel processing subsystem to execute the memory copy based on the priority of the copy hardware channel. Advantageously, by assigning priorities to streams and, subsequently, strategically requesting memory copies within the prioritized streams, an application developer may fine-tune their software application to increase the overall processing efficiency of the software application.

20 Claims, 7 Drawing Sheets

TECHNIQUES FOR ASSIGNING PRIORITIES TO MEMORY COPIES

BACKGROUND OF THE INVENTION

1. Field of the Invention

The present invention generally relates to general purpose computing and, more specifically, to techniques for assigning priorities to memory copies.

2. Description of the Related Art

A typical parallel processing subsystem, that may include one or more graphics processing units (GPUs), is capable of very high performance using a relatively large number of small, parallel execution threads on dedicated programmable hardware processing units. The specialized design of such parallel processing subsystems usually allows these subsystems to efficiently perform certain tasks, such as rendering 3-D scenes or computing the product of two matrices, using a high volume of concurrent computational and memory operations To fully realize the processing capabilities of advanced parallel processing subsystems, subsystem functionality may be exposed to application developers through one or more application programming interfaces (APIs) of calls and libraries. Among other things, doing so enables application developers to tailor a software application executing on a central processing unit (CPU) to optimize the way parallel processing subsystems function. In one approach to developing a software application, the software application developer may divide work included in the software application into streams of work components (e.g., computational and memory operations). Each stream may be executed concurrently on the parallel processing subsystem. Notably, work components included in different streams may run concurrently and may be interleaved. In contrast, within each stream, a sequence of work components executes in issue-order on the parallel processing subsystem.

Different types of parallel processing subsystem resources operate on different types of work components. For example, compute engines execute computational work components, and copy engines execute memory copies. Parallel processing subsystems are typically configured to receive work components via hardware channels, with each hardware channel dedicated to an appropriate type of work component. Acting as a liaison between the API and the host scheduler, an API driver aliases the work components submitted in each stream onto one or more available hardware channels. A host scheduler included in the parallel processing subsystem receives the work components conveyed through the hardware channels and, subsequently, schedules the work components to execute on appropriate resources. In particular, the API driver distributes memory copies included in various streams to copy hardware (HW) channels which are configured to convey memory copies to the host scheduler. Upon receiving memory copies via the copy HW channels, the host scheduler distributes the memory copies between one or more copy engines.

In one approach to scheduling memory copies, the host scheduler allocates discrete time slices to each copy HW channel. And the host scheduler executes the memory copies within each copy HW channel in issue-order. In other words, when executing memory copies included in a particular copy HW channel, the host scheduler selects the memory copy that was issued least recently. For example, suppose that the parallel processing subsystem were to include two copy HW channels and one copy engine. Further, suppose that the host scheduler were to initially direct the copy engine to begin executing the memory copies included in the first copy HW channel in issue-order. Finally, suppose that the copy engine were not able to complete all of the memory copies included in the first copy HW channel before the time slice of the first copy HW channel expired. When the time slice expired, the host scheduler would wait for any currently executing memory copy to complete and then begin executing memory copies included in the second copy HW channel (in issue-order). The host scheduler would continue to switch between the two copy HW channels in a similar manner.

One drawback to the above approach to scheduling memory copies is that executing memory copies in strict issue-order subject to the time-slice constraints of the copy HW channels may cause software applications to execute with unacceptable latency and throughput. More specifically, many software applications include multiple computational operations that can execute in parallel. These computational operations often have dependencies on memory copies which would, optimally, execute simultaneously. However, since the bandwidth to copy from system memory to GPU memory and from GPU memory to system memory is limited, one or more memory copies may experience undesirable delays. In particular, latency-sensitive computational operations may get blocked waiting for related memory copies to execute. For example, suppose that a software application were to be performing video decoding and encoding using a pipelined workflow. Further, suppose that the parallel processing subsystem were to include a single copy engine. Finally, suppose that the copy engine were to be occupied performing memory copies associated with the first few stages processing a fifth frame. The memory copies associated with the processing of a fourth frame by the last stage in the pipeline could be delayed. Consequently, the overall latency of the fourth frame could cause jitter in frame rates.

As the foregoing illustrates, what is needed in the art is a more effective technique for scheduling memory copies submitted to a parallel processing subsystems for processing.

SUMMARY OF THE INVENTION

One embodiment of the present invention sets forth a method for prioritizing a plurality of memory copy operations for execution within a parallel processing subsystem. The method includes receiving a request from a software application to execute a first memory copy operation within a first stream, identifying a first copy hardware channel to which the first stream is aliased, identifying a first priority that is associated with the first copy hardware channel, and inserting a sequence of commands into the first copy hardware channel that causes the parallel processing subsystem to schedule the execution of the first memory copy operation according to the first priority.

Other embodiments of the present invention include, without limitation, a computer-readable storage medium including instructions that, when executed by a processing unit, cause the processing unit to implement aspects of the techniques described herein as well as a system that includes different elements configured to implement aspects of the techniques described herein.

By implementing the disclosed techniques, the API driver enables software applications to guide the execution order of memory copies. By exploiting this functionality to prioritize memory copies, software applications may more effectively use the parallel processing subsystem resources, such as copy engines and memory bandwidth. Consequently, stalls and blockages associated with latency-sensitive memory copies may be reduced and the performance of the software applications may be improved.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
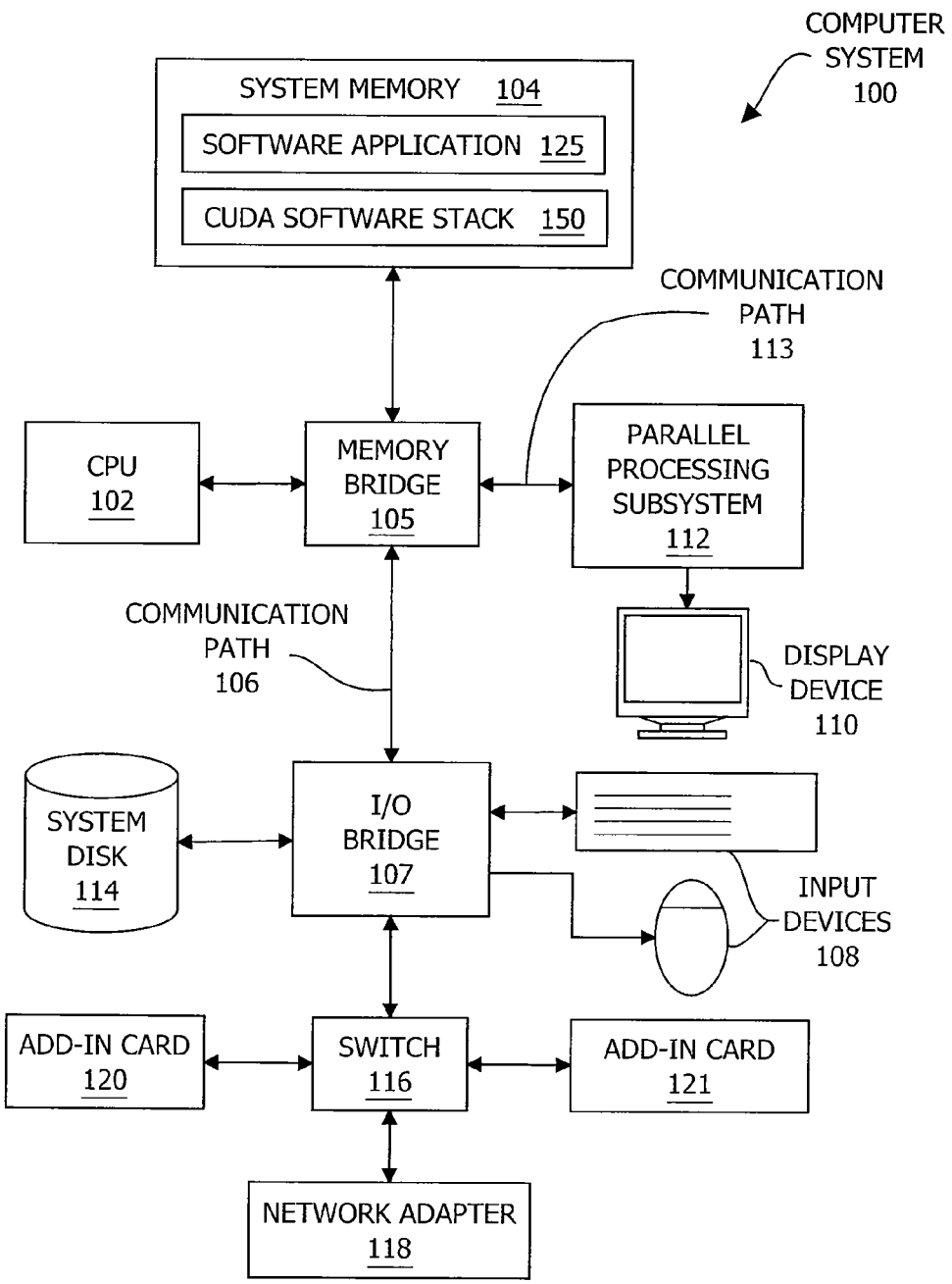
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

In operation, the CPU 102 is the master processor of the computer system 100, controlling and coordinating operations of other system components. In particular, the CPU 102 issues commands that control the operation of the parallel processing subsystem 112. Those commands may originate within a software application 125 resident in the system memory 104 and executing on the CPU 102. A compute unified device architecture (CUDA) software stack 150 is also resident in the system memory 104. CUDA is a general-purpose computing environment which uses the parallel processing subsystem 112 to perform various computing tasks. The CUDA software stack 150 is a set of programs included in the CUDA that issue and manage general-purpose computations that operate on components in the parallel processing subsystem 112. The software application 125 may generate requests (i.e., calls) for processing by the CUDA software stack 150 to produce a desired set of results. In alternate embodiments, the CUDA software stack may be replaced with any set of software programs that expose and manage parallel processing subsystem functionality. For example, the CUDA software stack may be replaced with a different general-purpose compute software stack or a graphics software stack. Further, the CUDA software stack may be configured to inter-operate with one or more additional software stacks.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
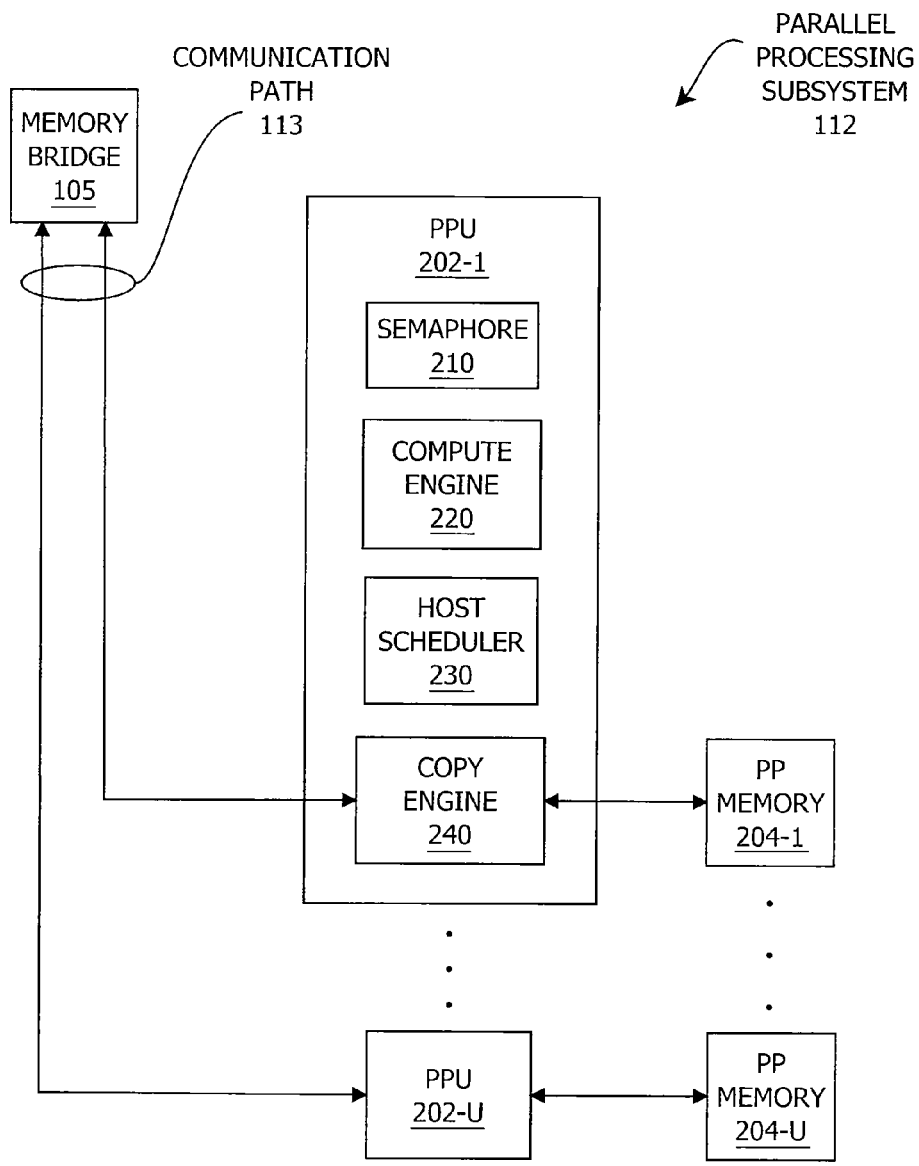
FIG. 2 is a block diagram illustrating the parallel processing subsystem of FIG. 1, according to one embodiment of the present invention.

FIG. 2 is a block diagram illustrating the parallel processing subsystem 112 of FIG. 1, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and hyphenated numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

Referring back now to FIG. 2 as well as FIG. 1, each PPU 202 communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, the PPU 202 can be integrated on a single chip with a bus bridge, such as memory bridge 105 or I/O bridge 107. In still other embodiments, some or all elements of PPU 202 may be integrated on a single chip with CPU 102. In one embodiment, communication path 113 is a PCI Express link, in which dedicated lanes are allocated to each PPU 202, as is known in the art. Other communication paths may also be used.

PPU 202-1 generates packets (or other signals) for transmission on communication path 113 and also receives incoming packets (or other signals) from communication path 113, directing the incoming packets to appropriate components of PPU 202. Notably, the communication path 113 includes one or more hardware channels (not shown) for transmission of work components to a host scheduler 230. The host scheduler 230 assigns each work component to an appropriate resource within the parallel processing subsystem 112 for processing. Notably, the host scheduler 230 receives computational operations via one or more compute hardware channels (not shown) and assigns these computational operations to a compute engine 220 for processing. And the host scheduler 230 receives memory copies via one or more copy hardware channels (not shown) and assigns these memory copies to a copy engine 240 for processing.

As shown, the PPU 202-1 also includes a semaphore 210. The semaphore 210 is may be used as a control by one or more existing semaphore mechanisms included in the PPU 202-1. In particular, as part of the scheduling process, the host scheduler 230 is configured to create and access the semaphore 210. In alternate embodiments, semaphores may be configured by different PPU 202-1 components to facilitate a variety of tasks, such as synchronization operations and enforcing exclusive access to an object. The semaphore 210 may be included in any memory accessible by the PPU 202-1. Further, the semaphore 210 and associated semaphore mechanisms may be implemented using any protocols known in the art. For example, the semaphore 210 may be included in the local parallel processing memory 204-1 and may be manipulated using atomic functions.

Each PPU 202 advantageously implements a highly parallel processing architecture. And each PPU 220 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. The PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory 204, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3:
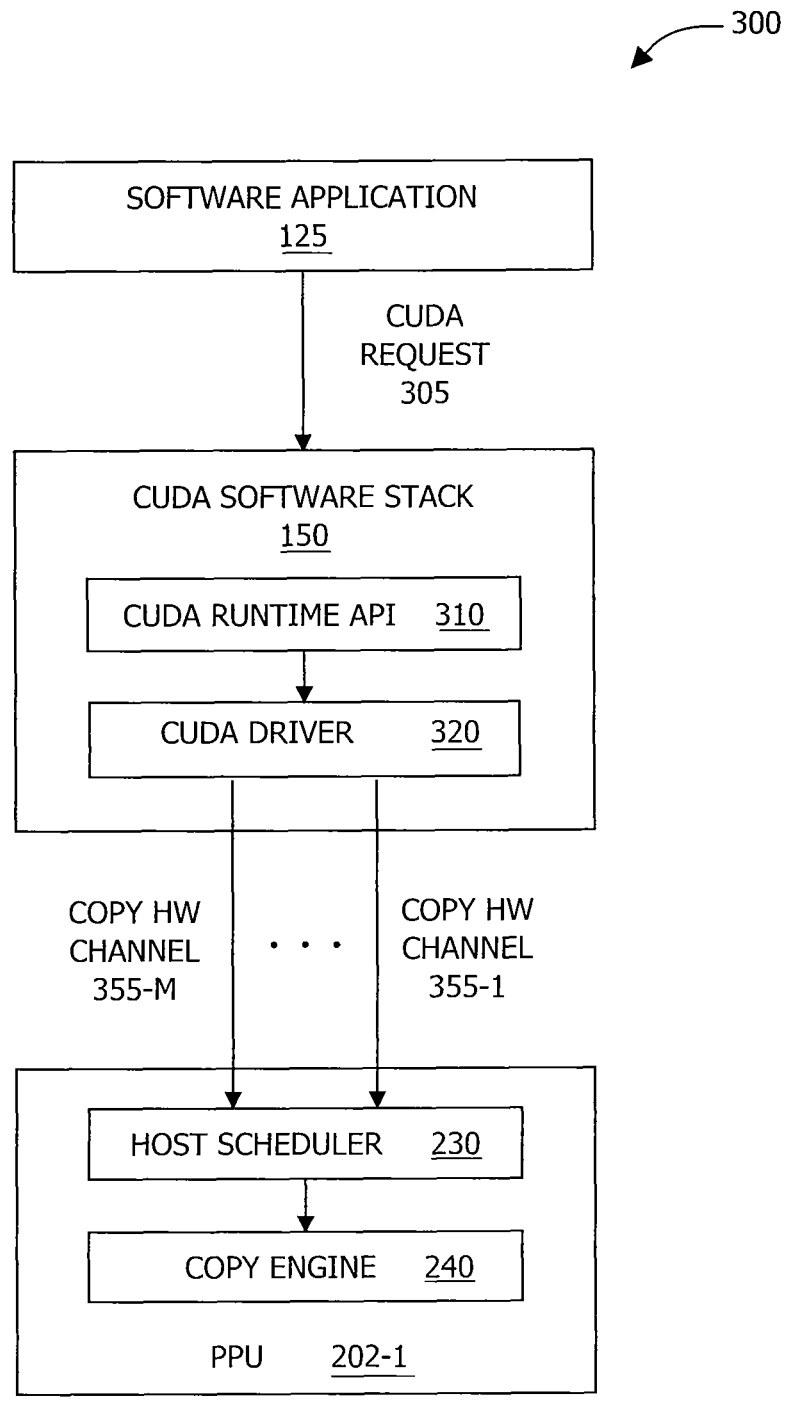
FIG. 3 is a conceptual diagram illustrating how CUDA requests to execute memory copies are processed within the parallel processing unit of FIG. 2, according to one embodiment of the present invention.

FIG. 3 is a conceptual diagram illustrating how CUDA requests 305 to execute memory copies are processed within the parallel processing unit 202-1 of FIG. 2, according to one embodiment of the present invention. As shown, the subsystem 300 includes, without limitation, the software application 125, the CUDA software stack 150, and the parallel processing unit (PPU) 202-1 of FIG. 2.

To efficiently achieve a set of results using the parallel processing subsystem 112, including the parallel processing unit 202-1, the software application 125 passes CUDA requests 305 to the CUDA software stack 150. As shown, the CUDA software stack 150 includes a CUDA runtime application programming interface (API) 310 and a CUDA driver 320. The CUDA runtime API 310 includes calls and libraries that expose the functionality of the parallel processing subsystem 112, including PPU 202-1, to application developers. And the CUDA driver 320 is configured to translate the CUDA requests 305 received by the CUDA runtime API 210 to lower-level commands that execute on components within the parallel processing subsystem 112. More specifically, the CUDA driver 320 may submit one or more streams (not shown) to the parallel processing subsystem 112 for execution within the PPU 202-1. Each stream may include any number, including zero, of work components, such as computational components and memory components, in any combination. Within each stream, the work components execute in issue-order on the PPU 202-1. However work components included in different streams may run concurrently and may be interleaved.

In particular, the CUDA software stack 150 is configured to expose functionality that enables the software application 125 to efficiently use the PPU 202-1 resources to process one or more memory copies included a stream. As persons skilled in the art will understand, the bandwidth to copy from the system memory 104 to the PP memory 204-1 and from the PP memory 204-1 to the system memory 104 is limited. And the PP memory 204-1 provides a much higher bandwidth to the execution engines, such as the compute engine 220, included in the PPU 202-1 than the system memory 104 provides. Consequently, the software application 125 typically issues memory copy CUDA requests 305 to copy data from the system memory 104 to the PP memory 204-1 before performing computational operations on the data using the PPU 202-1. Similarly, the software application 125 issues memory copy CUDA requests 305 to copy data from the PP memory 204-1 to the system memory 104 before performing CPU 102 operations on the data.

Advantageously, the CUDA driver 320 is configured to direct the PPU 202-1 to execute memory copies based on stream priories established by CUDA requests 305 received from the software application 125. More specifically, the CUDA runtime API 310 supports CUDA requests 305 that enable the software application 125 to assign stream priorities to streams. Upon receiving a particular CUDA request 305 to assign a stream priority to a stream, the CUDA driver 320 aliases the stream to a copy hardware (HW) channel 355 based on the stream priority. For example, suppose that there were to be two copy HW channels 355, a high priority copy HW channel 355-2 and a low priority copy HW channel 355-1. Further, suppose that the stream priority were to be a high stream priority. The CUDA driver 320 would map the stream to the high priority copy HW channel 355-2.

The priorities of the copy HW channels 355 are used locally by the CUDA driver 320 and are unknown outside the CUDA driver 320. Further, the functionality that causes the memory copies to execute based on priority is implemented within the CUDA driver 320 and conveyed via the commands the CUDA driver 320 inserts into the copy HW channels 355. To facilitate the prioritization functionality, the CUDA driver 320 creates a semaphore 210 for all but the lowest of the priorities associated with one or more of the copy HW channels 355. More specifically, if the CUDA driver 320 associates a low priority 1 through a high priority "P" with one or more of the copy HW channels 355, then the CUDA driver 320 creates "P-1" semaphores 210. Subsequently, the CUDA driver 320 associates the semaphore 210-2 with the priority 2, the semaphore 210-3 with the priority 3, and so on.

The CUDA runtime API 310 may support any number of stream priorities, the CUDA driver 320 may internally support any number of priorities, and the computer system 100 may be configured with any number of copy HW channels 355. Further, the number of stream priorities may be higher, lower, or equal to the number of priorities that the CUDA driver 320 internally supports. Similarly, the number of priorities that the CUDA driver 320 internally supports may be higher, lower, or equal to the number of copy HW channels 355. In the computer system 100, the stream priorities and the priorities that the CUDA driver 320 internally supports both use higher numbers to represent higher priorities. However, in alternate embodiments, either or both of the stream priorities and the priorities that the CUDA driver 320 internally supports may use lower numbers to represent higher priorities. The CUDA driver 320 may perform the mappings between stream priorities, the priorities the CUDA driver 320 internally supports, and the copy HW channels 355 in any technically feasible fashion. Further, in alternate embodiments, the CUDA driver may implement the prioritization functionality detailed herein using synchronization mechanisms that do not require semaphores 210.

Upon receiving a particular CUDA request 305 to perform a memory copy in a stream, the CUDA driver 320 processes the CUDA request 305 before including the memory copy in the copy HW channel 355 to which the stream is aliased. The commands that the CUDA driver 320 inserts into the copy HW channel 355 are received by the host scheduler 230. The host scheduler 230 then schedules components within the PPU 202-1 to execute these commands. In particular, the host scheduler 230 schedules the copy engine 240 to execute memory copy commands.

In prior-art approaches to scheduling memory copies, the CUDA driver typically receives CUDA requests to perform memory copies within streams and distributes the memory copies to aliased copy HW channels without considering priorities. And the host scheduler allocates a time-slice to each of the copy HW channels. The host scheduler selects the copy HW channel that includes the least-recently received operation, such as a memory copy. The host scheduler then directs the copy engine to process memory copies included in the selected copy HW channel. The copy engine processes the schedulable (i.e., not constrained by dependencies or synchronization operations) memory copies included in the selected copy HW channel until the time-slice of the selected copy HW channel expires. The host scheduler then repeats this procedure, again selecting the copy HW channel that includes the least-recently received operation. In contrast to the above prior-art approach to scheduling memory copies, the CUDA driver 320 is configured to direct the host scheduler 230 to execute memory copies in a more flexible, priority-based order. More specifically, the CUDA driver 320 inserts semaphore operations in conjunction with memory copies into the copy HW channels 355 to influence the behavior of the host scheduler 230. In particular, the semaphore operations guide the host scheduler 230 to schedule higher priority copy HW channels 355 in preference to lower priority copy HW channels 355 and to circumvent the time-slice constraints.

As previously disclosed, the CUDA driver 320 creates and associates one semaphore 210 with each of the priorities associated with one or more copy HW channels 355 except for the lowest priority. The CUDA driver 320 uses the semaphores 210 to track the number of unexecuted memory copies of each priority included in the copy HW channels 355. For example, if the semaphore 210-2 associated with priority 2 were 5, then the copy HW channels 355 associated with priority 2 would include exactly 5 unexecuted and schedulable memory copies. And if the semaphore 210-2 associated with priority 2 were 0, then the copy HW channels associated with priority 2 would include no unexecuted and schedulable memory copies. The CUDA driver 320 uses semaphore operations to maintain the correct count of unexecuted memory copies. And the CUDA driver 320 uses semaphore operations to block the execution of memory copies included in copy HW channels 355 associated with priorities lower than the priorities of non-zero semaphores 210. As persons skilled in the art will understand, the copy engine 240 executes memory copies, and the host scheduler 230 executes semaphore operations. Further, the host scheduler 230 coordinates the memory copies and the semaphore operations.

In operation, before inserting a memory copy "M100" into a selected copy HW channel 355, the CUDA driver 320 inserts a "semaphore acquire 0" operation for each semaphore 210 associated with a priority higher than the priority of the selected copy HW channel 355. As persons skilled in the art will understand, these semaphore operations ensure that all schedulable memory operations included in higher priority copy HW channels 355 are executed before memory copy "M100." For example, suppose that the CUDA driver 320 receives a memory copy "X" and inserts the memory copy "X" into the lowest priority copy HW channel 355. Further, suppose that the CUDA driver 320 then receives a memory copy "Y" and inserts the memory copy "Y" into a higher priority copy HW channel 355. Finally, suppose that the copy engine 240 had not started to execute the memory copy "X." The semaphore operations would ensure that the memory copy "Y" would be executed before the memory copy "X."

After inserting the "semaphore acquire 0" operations associated with the memory copy "M100," the CUDA driver 320 inserts either one or three additional commands into the selected copy HW channel 355. If the priority of the selected copy HW channel 355 is not the lowest priority, then the CUDA driver 320 inserts a "semaphore increment" operation for the semaphore 210 associated with the priority of the selected copy HW channel 355. Regardless of the priority of the selected copy HW channel 355, the CUDA driver 320 then inserts the memory copy "M100" into the selected copy HW channel 355. And, if the priority of the selected copy HW channel 355 is not the lowest priority, then the CUDA driver 320 inserts a "semaphore decrement" operation for the semaphore 210 associated with the priority of the selected copy HW channel 355. By bracketing the memory copy "M100" in this fashion, the CUDA driver 320 updates the semaphore 210 associated with the priority of the selected copy HW channel 355 to reflect the execution status of the memory copy "M100" in the count of unexecuted memory copies.

For example, suppose that the PPU 202-1 were to include one copy engine 240 and two copy HW channels 355. Further, suppose that the CUDA driver 320 were to designate one copy HW channel 355-1 for low priority memory copies and one copy HW channel 355-2 for high priority memory copies. To request that the PPU 202-1 perform a high priority memory copy, the CUDA 320 driver would insert three commands into the high priority copy HW channel 355-2. First, the CUDA driver 320 would insert a command to increment the semaphore 210-2 associated with the high priority copy HW channel 355-2. Second, the CUDA driver 320 would insert a command to perform the high priority memory copy. Third, the CUDA driver 320 would insert a command to decrement the semaphore 210-2 associated with the high priority copy HW channel 355-2. And to request that the PPU 202-1 perform a low priority memory copy, the CUDA driver 320 would insert two commands into the low priority copy HW channel 355-1. First, the CUDA driver 320 would insert a command to acquire a value of 0 for the semaphore 210-2 associated with the high priority copy HW channel 355-2. Second, the CUDA driver 320 would insert a command to execute the low priority memory copy. As disclosed previously herein, this approach can be extended to influence execution order between memory copies included in any number of copy HW channels 355.

In operation, suppose that the host scheduler 230 were to receive one or more memory copies in a higher priority copy HW channel 355 while the copy engine 240 were executing a memory copy included in a lower priority copy HW channel 355. The semaphore operations inserted by the CUDA driver 320 would cause the host scheduler 230 to stop submitting memory copies included in the lower priority copy HW channel 355 to the copy engine 240 irrespective of the time-slice. Further, the semaphore operations would cause the host scheduler 230 to begin submitting memory copies included the higher priority copy HW channel 355 to the copy engine 240. And, suppose that the time slice of the higher priority copy HW channel 355 were to expire while there were unexecuted and schedulable memory copies included the higher priority copy HW channel 355. The host scheduler 230 would consult the operations included in the lower priority copy HW channels 355 and discover that the CUDA driver 320 had inserted semaphore operations that blocked the execution of the lower priority copy HW channels 335. Consequently, the host scheduler 230 would resume executing the memory copies included in the higher priority copy HW channel 355.

Advantageously, by guiding the execution order of memory copies, the CUDA driver 320 enables application developers to increase the performance of their software application 125 by decreasing latency and increasing throughput. For instance, suppose that in a pipelined video decoding and encoding algorithm, an application developer were to assign memory copies that are more sensitive to latency to a high priority stream and memory copies that are less sensitive to latency to a low priority stream. Further, suppose that the PPU 202-1 were to include the low priority copy HW channel 355-1 and the high priority copy HW channel 355-2. The CUDA driver 320 would insert memory copies included in the low priority stream in conjunction with synchronization operations into the low priority copy HW channel 355-1. Similarly, the CUDA driver 320 would insert memory copies included in the high priority stream in conjunction with synchronization operations into the high priority copy HW channel 355-2. The commands inserted by CUDA driver 320 into the copy HW channel 355 would influence the copy engine 240 to execute the more latency sensitive memory copies in preference to the less latency sensitive memory copies. Consequently, the overall latency of individual frames could be decreased and, therefore, the likelihood of jitter in the frame rates could also be decreased. As this example illustrates, the disclosed techniques enable application developers to more effectively use the PPU 202 resources, such as copy engines 240 and memory bandwidth, to increase the performance of software applications 125.

Figure 4:
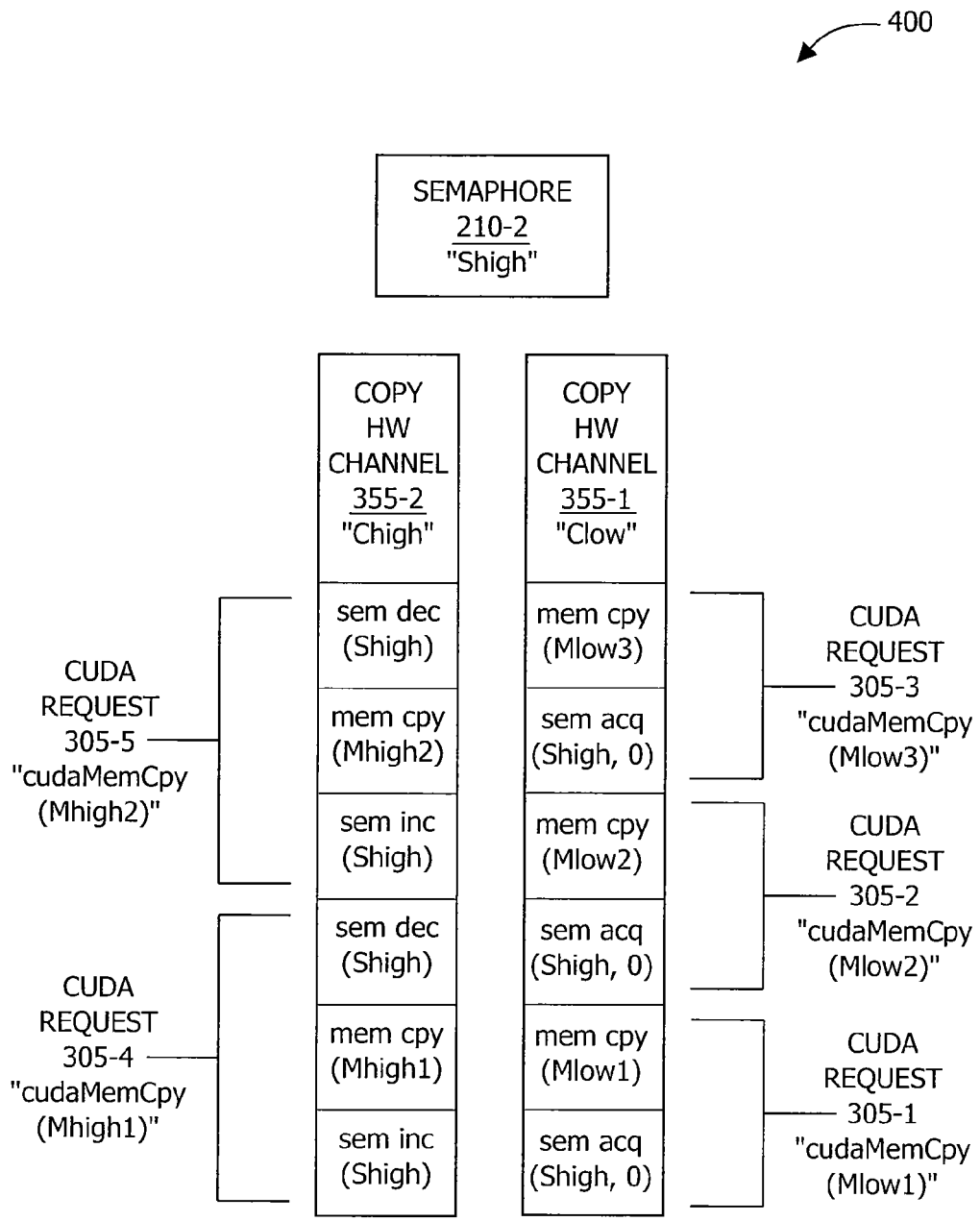
FIG. 4 is a conceptual diagram illustrating the CUDA requests with corresponding copy HW channels of FIG. 3, according to one embodiment of the present invention.

FIG. 4 is a conceptual diagram illustrating the CUDA requests 305 with corresponding copy HW channels 355 of FIG. 3, according to one embodiment of the present invention. The CUDA driver 320 creates and configures the semaphore 210-2 "Shigh" to track the number of unexecuted memory copies included in the copy HW channel 355-2 "Chigh." As the CUDA driver 320 receives the CUDA requests 305-1 to 305-5 to execute memory copies, the CUDA driver 320 inserts corresponding commands into the copy HW channels 355-1 "Clow" and 355-2 "Chigh." More specifically, for each CUDA request 305 to execute a memory copy, the CUDA driver 320 includes commands that use the semaphore 210-2 "Shigh" to control the order in which the copy engine 240 executes the memory copy.

Referring again to FIG. 2 as well as FIG. 4, the parallel processing subsystem 112 includes PPU 202-1. And PPU 202-1 includes the host scheduler 230 and a single copy engine 240. Referring back now to FIG. 4, the first CUDA request 305-1 "cudaMemCpy (Mlow1)" requests that a memory copy accessing Mlow1 be included in a low priority stream (not shown). Upon receiving CUDA request 305-1, the CUDA driver 320 inserts two commands into the copy HW channel 355-1 "Clow" to which the low priority stream is aliased. The first command "sem acq (Shigh, 0)," directs the host scheduler 230 to not process subsequent operations included in the copy HW channel 355-1 "Clow" until the semaphore 210-2 "Shigh" is zero. Because there are no memory operations included in the copy HW channel 355-2 "Chigh," the semaphore 210-2 "Shigh" is zero. Consequently, the host scheduler 230 processes the second command included in the copy HW channel 355-1 "Clow", "mem cpy (Mlow1)," and directs the copy engine 240 to perform the memory copy accessing Mlow1.

While the copy engine 240 is performing the memory copy accessing Mlow1, the CUDA driver 320 receives the remaining CUDA requests 305-2 through 305-5. The second CUDA request 305-2 "cudaMemCpy (Mlow2)" requests that a memory copy accessing Mlow2 be included in the low priority stream. Upon receiving CUDA request 305-2, the CUDA driver 320 inserts two commands into the copy HW channel 355-1 "Clow" to which the low priority stream is aliased. Again, the first command "sem acq (Shigh, 0)," directs the host scheduler 230 to not process subsequent operations included in the copy HW channel 355-1 "Clow" until the semaphore 210-2 "Shigh" is zero. The second command "mem cpy (Mlow2)" directs the host scheduler 230 to process the memory copy accessing Mlow 2. Similarly, the third CUDA request 305-3 "cudaMemCpy (Mlow3)" requests that a memory copy accessing Mlow3 be included in the low priority stream. Upon receiving CUDA request 305-3, the CUDA driver 320 inserts two more commands into copy HW channel 355-1 "Clow:" "sem acq (Shigh, 0)" and "mem cpy (Mlow3)."

The fourth CUDA request 305-4 "cudaMemCpy (Mhigh1)" requests that a memory copy accessing Mhigh1 be included in a high priority stream. Upon receiving CUDA request 305-4, the CUDA 320 driver inserts three commands into the copy HW channel 355-2 "Chigh" to which the high priority stream is aliased. The first command "sem inc (Shigh)" directs the host scheduler 230 to increment the semaphore 210-2 "Shigh." Since the host scheduler 230 does not require the copy engine 230 to execute this command, the host scheduler 230 immediately increments the semaphore 210-2 "Shigh." Consequently, the value of semaphore 210-2 "sHigh" becomes 1. The second command "mem cpy (Mhigh1)" directs the host scheduler 230 to process the memory copy accessing Mhigh1. However, the copy engine 230 is still executing the memory copy accessing Mlow1, so the host scheduler 230 cannot immediately process this command (or any subsequent commands included in the copy HW channel 355-2 "Chigh"). The third command "sem dec (Shigh)," directs the host scheduler 230 to decrement the semaphore 210-2 "Shigh." Similarly, the fifth CUDA request 305-5 "cudaMemCpy(Mhigh2) causes the CUDA driver 320 to insert three more commands into the copy HW channel 355-2 "Chigh:" "sem inc (Shigh)," "mem cpy (Mlhigh2), and "sem dec (Shigh)."

After the CUDA driver 320 processes the final CUDA request 305-5, the copy engine 240 finishes performing the memory copy accessing Mlow1. The host scheduler 230 then processes the next command included in the copy HW channel 355-1 "Clow." The next command is "mem acq (Shigh, 0)." Since the semaphore 210-2 "Shigh" is 1, the host scheduler 230 suspends executing commands included in copy HW channel 355-1 "Clow" until the semaphore 210-2 "Shigh" is 0. The host scheduler 230 then switches to the copy HW channel 355-2 "Chigh." The next unexecuted and schedulable command included in the copy HW channel 355-2 "Chigh" is the command "mem cpy (Mhigh1)." Since the copy engine 240 is now available, the host scheduler 230 directs the copy engine 240 to perform the memory copy accessing Mhigh1.

The time slice (not shown) associated with the copy HW channel 355-2 "Chigh" expires while the copy engine 240 is performing the memory copy accessing Mhigh1. Consequently, when the copy engine 240 finishes performing the memory copy accessing Mhigh1, the host scheduler 230 switches to the copy HW channel 355-1 "Clow." Since the semaphore 210-2 "Shigh" is still 1, the host scheduler 230 continues to suspend executing commands included in copy HW channel 355-1 "Clow." Instead, the host scheduler 230 switches back to the copy HW channel 355-2 "Chigh," and resumes executing the commands included in the copy HW channel 355-2 "Chigh." The host scheduler 230 executes the third and fourth commands included in the copy HW channel 355-2 "Chigh:" "sem dec (Shigh)" and "sem inc (Shigh)," causing the semaphore 210-2 "Shigh" to transition to 0 and then immediately back to 1. The next unexecuted and schedulable command included in the copy HW channel 355-2 "Chigh" is the command "mem cpy (Mhigh2)." Since the copy engine 240 is available, the host scheduler 230 directs the copy engine 240 to perform the memory copy accessing Mhigh2.

The copy engine 240 finishes performing the memory copy accessing Mhigh2 before the time-slice associated with the copy HW channel 355-2 "Chigh" expires. Consequently, the host scheduler 230 processes the final command included in the copy HW channel 355-2, "sem dec (Shigh)," causing the semaphore 210-2 "Shigh" to return to 0. Since there are no remaining commands included in the copy HW channel 355-2 "Chigh," the host scheduler 230 switches to the copy HW channel 355-1 "Clow." Because the semaphore 210-2 "Shigh" is now 0, the host scheduler 230 acquires the value of the semaphore 210-2 "Shigh" of 0 and resumes executing commands included in the copy HW channel 355-1 "Clow."

Figure 5:
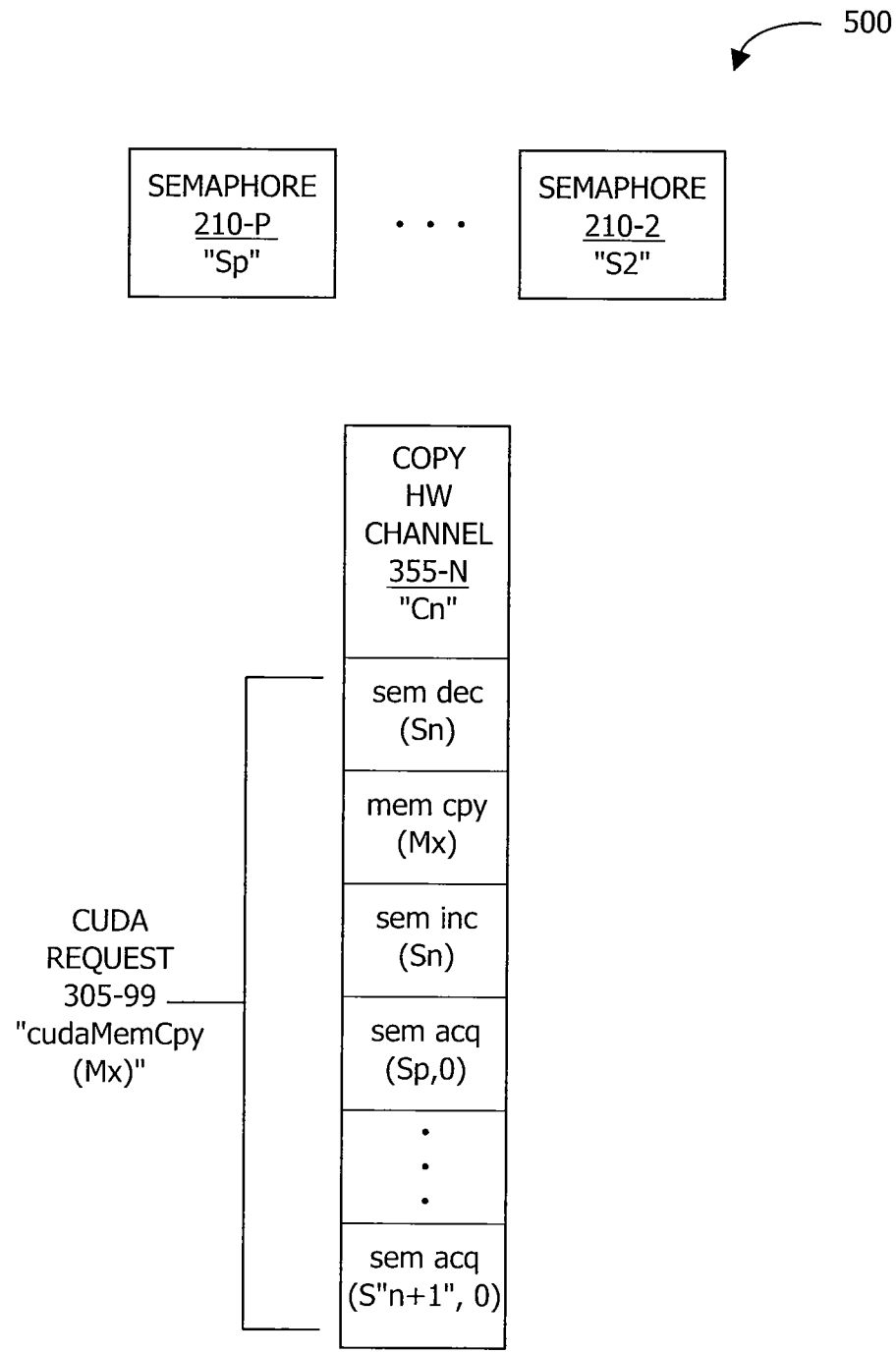
FIG. 5 is a conceptual diagram illustrating the copy HW channel of FIG. 3, according to another embodiment of the present invention.

FIG. 5 is a conceptual diagram illustrating the copy HW channel 355 of FIG. 3, according to another embodiment of the present invention. The exemplary copy HW channel 355-N is associated with a priority of N, where N is greater than the lowest priority 1 and less than the highest priority ""P." Since there are P priorities, the CUDA driver 320 creates and maintains "P-1" semaphores 210-2 through 210-P corresponding to the priorities 2 through P respectively.

Upon receiving a CUDA request 305-99 "cudaMemCpy (Mx)," to perform a memory copy accessing Mx within the stream associated with priority N, the CUDA driver 320 inserts two sets of commands into the copy HW channel 355-N "Cn." The first set of commands ensures that the memory copy accessing Mx does not execute until there are no unexecuted memory copies included in any higher priority copy HW channels 355. Notably, the first set of commands directs the host scheduler 230 to obtain a value of 0 on each of the semaphores 210-"N+1" through 210-P.

The second set of commands ensures that the memory copy accessing Mx executes before any unexecuted memory copies included in any lower priority copy HW channels 355. More specifically, the second set of commands causes the host scheduler 230 to sequentially increment the semaphore 210-N, direct the copy engine 240 to execute the memory copy accessing Mx, and finally decrement the semaphore 210-N.

Figure 6A:
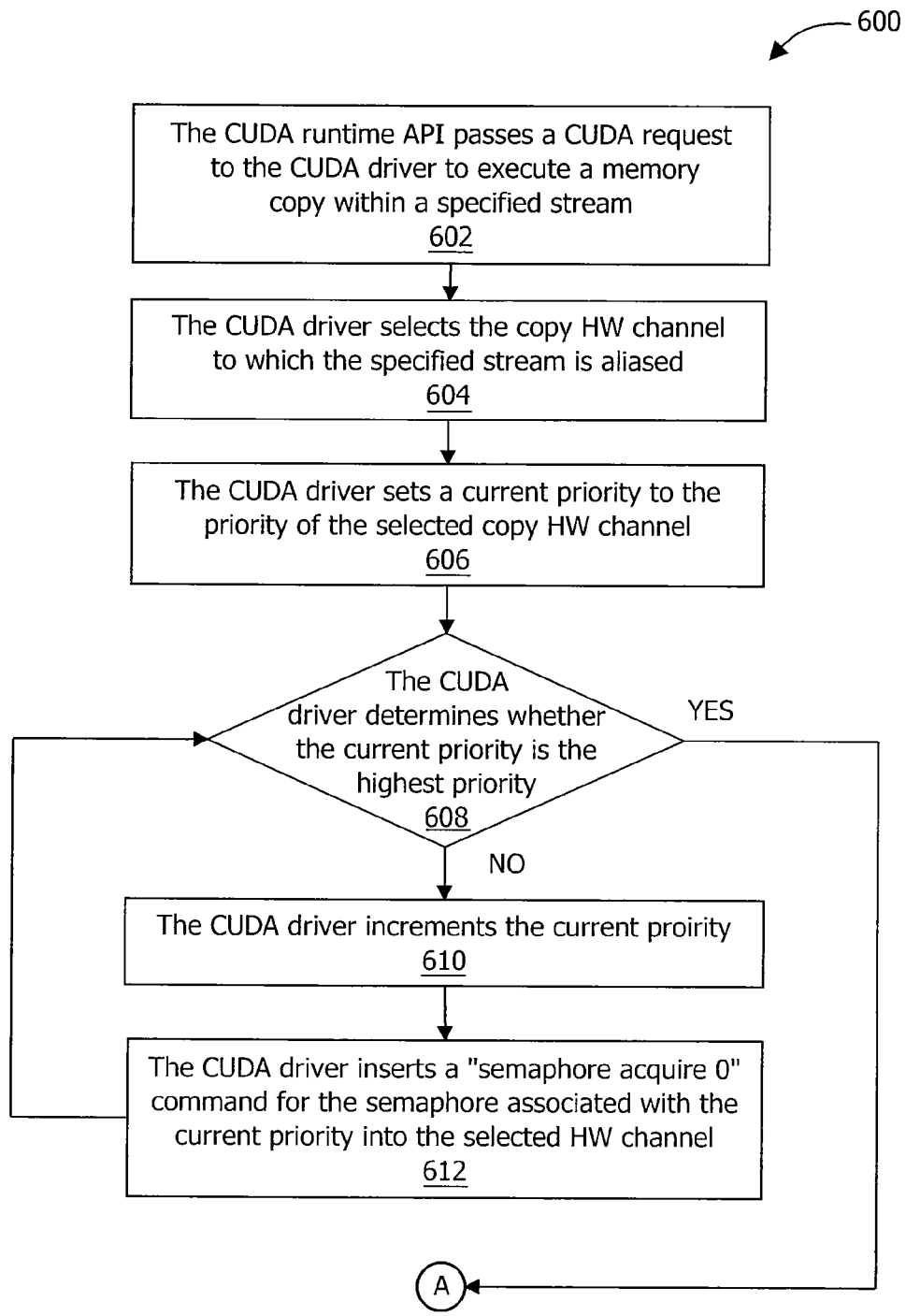
FIGS. 6A-6B set forth a flow diagram of method steps for determining the execution priority of different memory copies, according to one embodiment of the present invention.
Figure 6B:
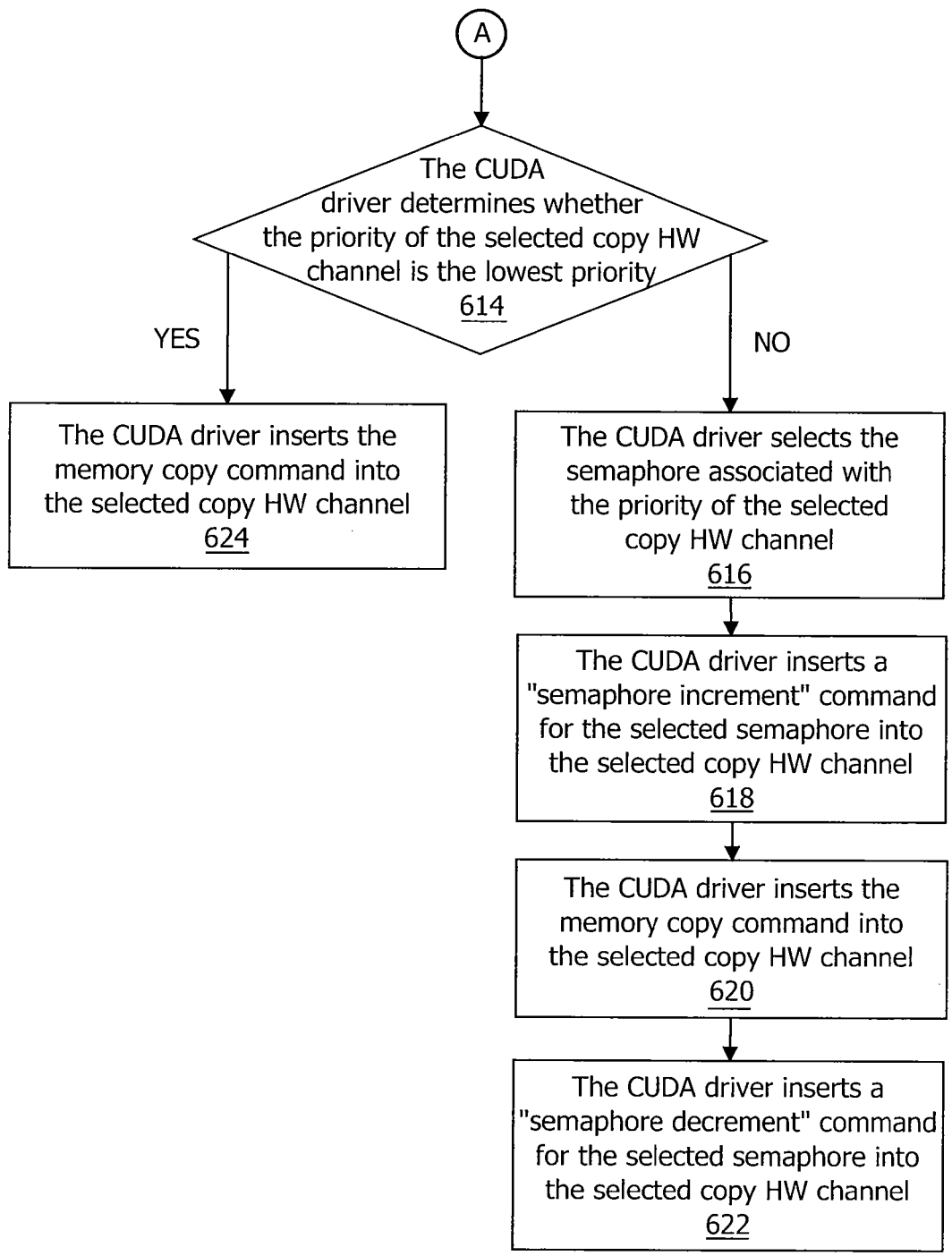

FIGS. 6A-6B set forth a flow diagram of method steps for determining the execution priority of different memory copies, according to one embodiment of the present invention. Although the method steps are described with reference to the systems of FIGS. 1-5, persons skilled in the art will understand that any system configured to implement the method steps, in any order, falls within the scope of the present invention.

As shown, a method 600 begins at step 602, where the CUDA runtime API 310 passes a CUDA request 305 to the CUDA driver 320 to execute a memory copy within a specified stream. At step 604, the CUDA driver 320 selects the copy HW channel 355 to which the specified stream is aliased. At step 606, the CUDA driver 320 sets a current priority to the priority of the selected copy HW channel 355. At step 608, if the CUDA driver 320 determines that the current priority is not the highest priority associated with any of the copy HW channels 355, then the method 600 proceeds to step 610. At step 610, the CUDA driver 320 increments the current priority. As previously noted, in this embodiment, higher priorities are associated with higher numbers, and one is the lowest priority. In alternate embodiments, higher priorities could be associated with lower numbers and, consequently, the implementation details would be altered accordingly. At step 612, the CUDA driver 320 inserts a "semaphore acquire 0" command for the semaphore 210 associated with the current priority into the selected HW channel 355, and the method 600 returns to step 608.

The CUDA driver 320 cycles through steps 608 through 612, inserting commands into the selected copy HW channel 355 until the CUDA driver 320 has inserted commands associated with each of the priorities that are higher than the priority of the selected copy HW channel 355. In operation, these commands direct the host scheduler 230 to block operations included in the selected copy HW channel 355 until the memory copies included in the copy HW channels 355 associated with higher priorities have been executed. If, at step 608, the CUDA driver 320 determines that the current priority is the highest priority associated with any of the copy HW channels 355, then the method 600 proceeds to step 614.

At step 614, if the CUDA driver determines that the priority of the selected copy HW channels 355 is not the lowest priority of any of the copy HW channels 355, then the method 600 proceeds to step 616. At step 616, the CUDA driver 320 selects the semaphore 210 associated with the priority of the selected copy HW channel 355. At step 618, the CUDA driver 320 inserts a "semaphore increment" command for the selected semaphore 210 into the selected copy HW channel 355. Advantageously, in conjunction with commands included in the lower priority copy HW channels 355, this command increases the number of blockages prohibiting the execution of memory copies included in the lower priority copy HW channels 355. At step 620, the CUDA driver 320 inserts the memory copy command into the selected copy HW channel 355. At step 622, the CUDA driver 320 inserts a "semaphore decrement" command for the selected semaphore into the selected copy HW channel 355, and the method 600 terminates. In conjunction with commands included in the lower priority copy HW channels 355, this command reduces the number of blockages prohibiting the execution of memory copies included in the lower priority copy HW channels 355.

If, at step 614, the priority of the selected copy HW channel 355 is the lowest priority of any of the copy HW channels 355, then the method 600 proceeds to step 624. At step 624, the CUDA driver 320 inserts the memory copy command into the selected copy HW channel 355, and the method 600 terminates. In alternate embodiments, the CUDA driver may guide the ordering of memory copies in any technically feasible manner. For instance, the CUDA driver may use other synchronization mechanisms to ensure that memory copies included in higher priority copy HW channels are executed before memory copies included in lower priority copy HW channels.

In sum, memory copies may be more effectively implemented by dividing the memory copies between multiple HW channels based on priorities and using semaphores to guide the scheduling of the memory copies. In one embodiment, a CUDA driver assigns a priority to each copy HW channel. The CUDA driver then aliases streams to the copy HW channels based on the priorities of the streams in conjunction with the priorities of the copy HW channels. Subsequently, upon receiving a request to perform a particular memory copy in a particular stream, the CUDA driver selects the copy HW channel to which the stream is aliased. Based on the priority of the selected copy HW channel, the CUDA driver inserts one or more semaphore operations into the selected copy HW channel in conjunction with the request to perform the particular memory copy. More specifically, the CUDA driver uses semaphores to block memory copies included in lower priority copy HW channels from executing before memory copies included in higher priority copy HW channels. In particular, the semaphore commands may instruct the host scheduler to switch from a lower priority copy HW channel to a higher priority HW channel before the time-slice associated with the lower priority copy HW channel expires. Similarly, the semaphore commands may instruct the host scheduler to continuously execute memory copies in a higher priority copy HW channel even after the time-slice associated with the higher priority copy HW channel expires.

Advantageously, by guiding the execution order of memory copies, the CUDA driver enables application developers to optimally use parallel processing subsystem resources to increase the performance of their software applications. More specifically, application developers may tailor software applications by strategically assigning memory copies to prioritized streams based the sensitivity of the memory copies to latency. And the CUDA driver uses semaphores to cause the host scheduler to execute memory copies in priority-order, overriding strict issue-order and time-slice constraints. Consequently, the disclosed techniques enable application developers to more effectively use the parallel processing subsystem resources, such as copy engines and memory bandwidth, to reduce stalls and blockages associated with latency-sensitive memory copies. And reducing stalls and blockages may increase overall throughput and decrease the execution time of the software application.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for prioritizing a plurality of memory copy operations for execution within a parallel processing subsystem, the method comprising:
    receiving a request from a software application to execute a first memory copy operation within a first stream;
    identifying a first copy hardware channel to which the first stream is aliased;
    identifying a first priority that is associated with the first copy hardware channel; and
    inserting a sequence of commands into the first copy hardware channel that causes the parallel processing subsystem to schedule the execution of the first memory copy operation according to the first priority.

2. The method of claim 1, further comprising:
    receiving a preceding request from the software application to associate the first stream with a first stream priority; and
    aliasing the first stream to the first copy hardware channel based on the first stream priority and the first priority.

3. The method of claim 1, wherein the sequence of commands includes one or more synchronization operations.

4. The method of claim 3, wherein a second memory copy operation is included in a second copy hardware channel associated with a lower priority than the first priority, and the one or more synchronization operations block the second memory copy operation until the first memory copy operation has completed.

5. The method of claim 3, wherein a second memory copy operation is included in a second copy hardware channel associated with a higher priority than the first priority, and the one or more synchronization operations block the first memory copy operation until the second memory copy operation has completed.

6. The method of claim 3, wherein the synchronization operations comprise semaphore operations, and further comprising creating one or more semaphores.

7. The method of claim 6, wherein the first priority comprises a highest priority, and the sequence of commands comprises:
    a command to increment a semaphore associated with the highest priority;
    a command to execute the first memory copy operation; and
    a command to decrement the semaphore associated with the highest priority.

8. The method of claim 6, wherein the first priority comprises a lowest priority, and the sequence of commands comprises:
    one or more commands to acquire a value of zero on one or more semaphores associated with one or more priorities that are not the lowest priority; and
    a command to execute the first memory copy operation.

9. The method of claim 6, wherein the first priority comprises a mid-level priority, and the sequence of commands comprises:
    one or more commands to acquire a value of zero on one or more semaphores associated with one or more priorities that are higher than the middle priority;
    a command to increment a semaphore associated with the middle priority;
    a command to execute the first memory copy operation; and
    a command to decrement the semaphore associated with the middle priority.

10. A non-transitory computer-readable storage medium including instructions that, when executed by a processing unit, cause the processing unit to prioritize a plurality of memory copy operations for execution within a parallel processing subsystem by performing the steps of:
    receiving a request from a software application to execute a first memory copy operation within a first stream;
    identifying a first copy hardware channel to which the first stream is aliased;
    identifying a first priority that is associated with the first copy hardware channel; and
    inserting a sequence of commands into the first copy hardware channel that causes the parallel processing subsystem to schedule the execution of the first memory copy operation according to the first priority.

11. The non-transitory computer-readable storage medium of claim 10, further comprising:
    receiving a preceding request from the software application to associate the first stream with a first stream priority; and
    aliasing the first stream to the first copy hardware channel based on the first stream priority and the first priority.

12. The non-transitory computer-readable storage medium of claim 10, wherein the sequence of commands includes one or more synchronization operations.

13. The non-transitory computer-readable storage medium of claim 12, wherein a second memory copy operation is included in a second copy hardware channel associated with a lower priority than the first priority, and the one or more synchronization operations block the second memory copy operation until the first memory copy operation has completed.

14. The non-transitory computer-readable storage medium of claim 12, wherein a second memory copy operation is included in a second copy hardware channel associated with a higher priority than the first priority, and the one or more synchronization operations block the first memory copy operation until the second memory copy operation has completed.

15. The non-transitory computer-readable storage medium of claim 12, wherein the synchronization operations comprise semaphore operations, and further comprising creating one or more semaphores.

16. The non-transitory computer-readable storage medium of claim 15, wherein the first priority comprises a highest priority, and the sequence of commands comprises:
 a command to increment a semaphore associated with the highest priority;
 a command to execute the first memory copy operation; and
 a command to decrement the semaphore associated with the highest priority.

17. The non-transitory computer-readable storage medium of claim 15, wherein the first priority comprises a lowest priority, and the sequence of commands comprises:
 one or more commands to acquire a value of zero on one or more semaphores associated with one or more priorities that are not the lowest priority; and
 a command to execute the first memory copy operation.

18. The non-transitory computer-readable storage medium of claim 15, wherein the first priority comprises a mid-level priority, and the sequence of commands comprises:
 one or more commands to acquire a value of zero on one or more semaphores associated with one or more priorities that are higher than the middle priority;
 a command to increment a semaphore associated with the middle priority;
 a command to execute the first memory copy operation; and
 a command to decrement the semaphore associated with the middle priority.

19. A system configured to prioritize a plurality of memory copy operations for execution within a parallel processing subsystem, the system comprising:
 a memory that includes a driver program; and
 a processor that is coupled to the memory and, when executing the driver program, is configured to:
  receive a request from a software application to execute a first memory copy operation within a first stream;
  identify a first copy hardware channel to which the first stream is aliased;
  identify a first priority that is associated with the first copy hardware channel; and
  insert a sequence of commands into the first copy hardware channel that causes the parallel processing subsystem to schedule the execution of the first memory copy operation according to the first priority.

20. The system of claim 19, wherein the driver program is further configured to:
 receive a preceding request from the software application to associate the first stream with a first stream priority; and
 alias the first stream to the first copy hardware channel based on the first stream priority and the first priority.

* * * * *